United States Patent [19]

Nagashima et al.

[11] 4,304,386

[45] Dec. 8, 1981

[54] POSITION MEMORY DEVICE

[75] Inventors: Hideyuki Nagashima, Yokohama; Ken Kamijo, Yokosuka, both of Japan

[73] Assignee: Nissan Motor Co., Ltd., Yokohama, Japan

[21] Appl. No.: 82,408

[22] Filed: Oct. 5, 1979

[30] Foreign Application Priority Data

Oct. 9, 1978 [JP] Japan .................. 53-124312
Dec. 20, 1978 [JP] Japan .................. 53-176338[U]

[51] Int. Cl.$^3$ .................. F16M 13/00; A47C 1/025
[52] U.S. Cl. .................. 248/429; 297/330; 297/362
[58] Field of Search ............ 297/362, 330, 347, 348; 248/422, 429, 430, 393, 397

[56] References Cited

FOREIGN PATENT DOCUMENTS

2726100 12/1977 Fed. Rep. of Germany ...... 297/330
2640528 3/1978 Fed. Rep. of Germany ...... 297/330
2844360 4/1979 Fed. Rep. of Germany ...... 248/429

Primary Examiner—William E. Lyddane
Attorney, Agent, or Firm—Silverman, Cass & Singer, Ltd.

[57] ABSTRACT

A position memory device to be used for the power driven seat of a vehicle. The device comprises a memory wheel and memory switches to be engaged with the memory wheel at a selected position of the seat. Return to the selected position is identified by the re-engagement of the switches against the memory wheel at the memorized position and where the current supply circuit to the driving motor is interrupted.

5 Claims, 11 Drawing Figures

POSITION MEMORY DEVICE

BACKGROUND OF THE INVENTION (1) Field of the Invention

The present invention relates to a position memory device for the moving members such as a sliding element of a power driven seat or seat back of a reclining seat of a vehicle or the like.

(2) Description of the Prior Art

The conventional position memory device is generally based on a principle of a manual operating mechanism. In one such manual operating mechanism, there is a device using a memory wheel. For rotating such a memory wheel, it is necessary to rotate a reset cam. For this operation a considerable handling power is required.

Under this situation, a position memory device applicable for an electric motor driven mechanism has been desired.

SUMMARY OF THE INVENTION

In view of the aforementioned requirement, the present invention provides a position memory device for the operating member of an electric motor driven sliding mechanism of the seat and the seat back of a reclining seat.

According to the present invention, there is provided a position memory device for a power driven seat of a vehicle comprising:

a rotatable memory wheel;

means for connecting or disconnecting the memory wheel to or from the seat and converting movement of the seat to rotation of the memory wheel when connection therebetween is established;

means causing the memory wheel to rotate into a first position when the memory wheel is disconnected from the seat;

memory switch means which is set in the OFF condition while the memory wheel is in the first position, and in the ON condition while the memory wheel is in a position other than the first position; and power drive means for moving the seat together with the memory wheel in the ON condition of the memory switch means, and stopping the seat in the OFF condition of the memory switch means;

whereby, after the seat is stopped in a desired position and the memory wheel is disconnected from the seat and moved to the first position, the memory wheel is connected to the seat to thereby memorize the desired position.

BRIEF DESCRIPTION OF THE DRAWINGS

The invention will now be explained by referring to the accompanying drawings, in which:

FIG. 3 is a front view taken along the line III—III in FIG. 2a;

DESCRIPTION OF THE PREFERRED EMBODIMENTS

FIGS. 1 to 5 relate to a first embodiment of the present invention.

In this embodiment, the memory wheel is constructed of two main parts. These are a memory position wheel and a separate measurement wheel. The embodiment further relates to an arrangement using 2 memory switches.

Figure 1:
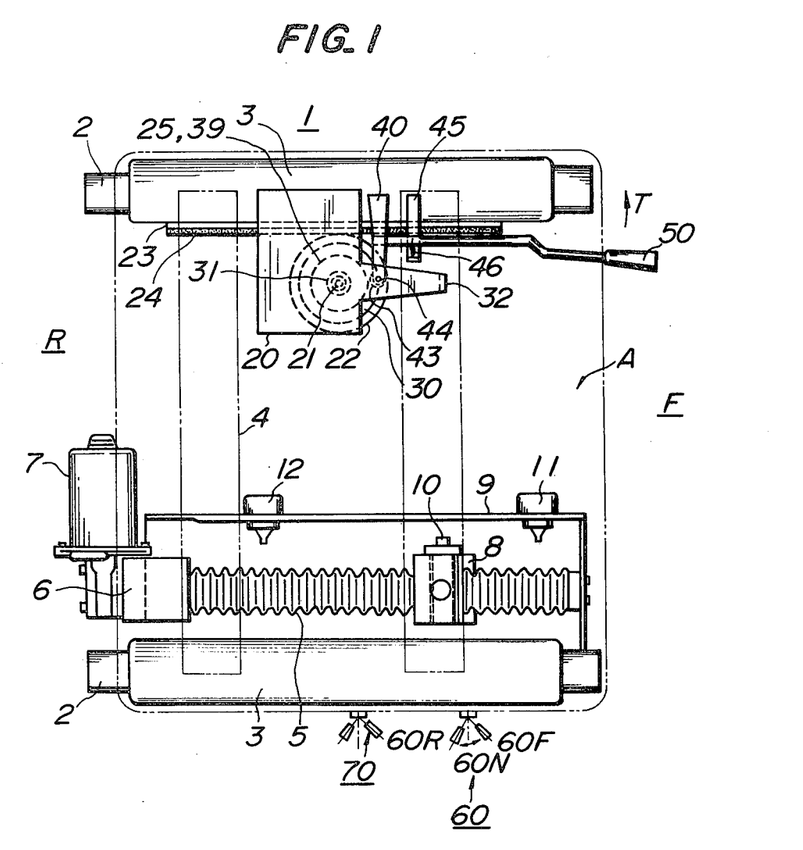
FIG. 1 is a plan view of a seat sliding device incorporated with the position memory device of the present invention.

As shown in FIG. 1, on a pair of parallel extending lower rails 2 fixed on the floor 1, upper rails 3 are provided to couple therewith to allow forward and rearward sliding movements. A pair of bridge members 4 having both of their ends fixed on said two upper rails 3 are slidably provided for movement in the forward and rearward directions. Over the bridge members 4, a seat cushion A is mounted as shown by a dash-dot line.

On the floor 1 close to and parallel to the right side lower rail 2 (in the figure the bottom lower rail) a main screw 5 for moving the seat is provided which is coupled to a driving motor 7 via a first gearbox 6.

A second gearbox 8 having a nut member meshed with the main screw 5 is fixed underneath the bridge member 4.

A front limiting switch 11 and a rear limiting switch 12 are provided on a frame 9 mounted on the floor at front and rear positions as indicated in the drawing. The limit switches 11 and 12 are arranged to interrupt the current supply circuit of the motor 7 when engaged by a pin 10 mounted on the second gearbox 8.

An envelope 20 of the memory device according to the present invention is mounted on the left upper rail 3 (in FIG. 1 the top rail).

Figure 3:
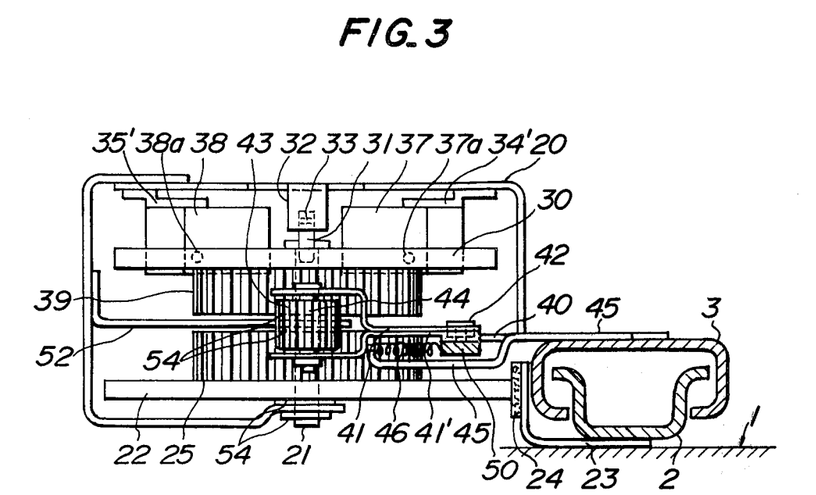

As can be seen more clearly from FIG. 3, a measuring wheel 22, which constitutes the first portion of the memory wheel, is mounted at the bottom of a vertical axis 21 of rotate therewith around the center of the envelope 20. A member 24 frictionally coupling with the peripheral surface of the measuring wheel 22 without substantial slip is fixed on a side surface of a bracket 23 of L-shaped cross-section in the front and rear direction. The L-shaped bracket 23 is fixed along the lower rail 2.

Above the measuring wheel 22, a first gear 25 is mounted integrally therewith. At the upper portion of the vertical axis 21, a position memory wheel 30 which is the second portion of the memory wheel is coupled to rotate therewith. On the upper surface of the position memory wheel 30, a pin 31 is inserted. A spring 33 extends between the pin 31 and a front end extrusion 32 of the envelope 20. This spring 33 applies a bias force to the position memory wheel 30 so that it normally releases to a predetermined stationary position. As can be seen from FIGS. 2a and 2b, two memory switches 37 and 38 i.e. a forward switch and a rearward switch are provided to engage with the periphery of the memory wheel 30. These switches are mounted in the envelope 20 via mounting brackets 34' and 35'.

Figure 5:
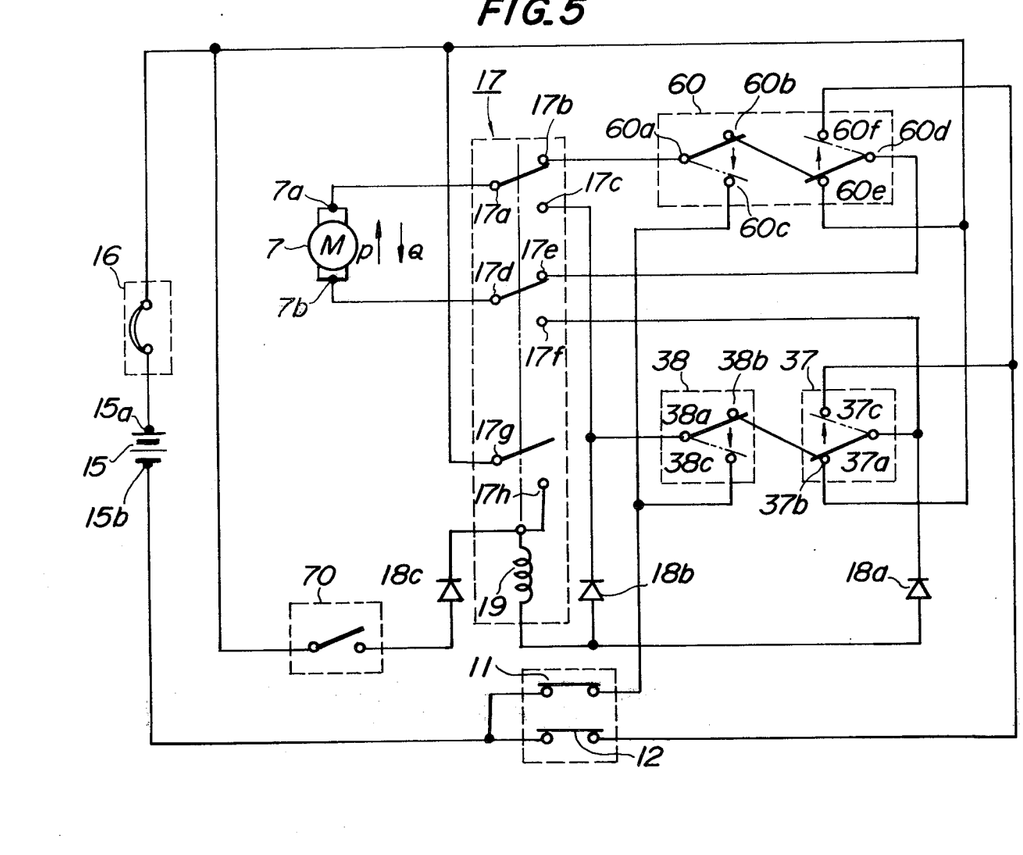
FIG. 5 is a circuit diagram of the device according to the present invention.

The memory switches 37 and 38 comprise operating levers 37a and 38a, respectively. These operating levers 37a and 38a may extend in a re-entrant recess 36 formed on the periphery of the memory wheel 30. In this arrangement, the operating levers 37a and 38a are switched to contact stationary switches 37b and 38b as shown in FIG. 5 to place the switches in the OFF condition. If either one of the switching levers 37a or 38a is out of the recess 36, such one of the levers 37a or 38a makes contact with a switching member 37c or 38c and either of the switches adopts the ON condition.

Except while both of the operating levers 37a and 38a are in the recess 36 to place the switches in the OFF condition, either one of the operating levers 37a or 38a keeps memory switch 37 or 38 in an ON condition throughout the whole rotating movement of the memory wheel 30.

There is no chance that both the operating levers 37a and 38a make contact with the periphery of the memory wheel 30 to cause the ON condition.

Figure 2A:
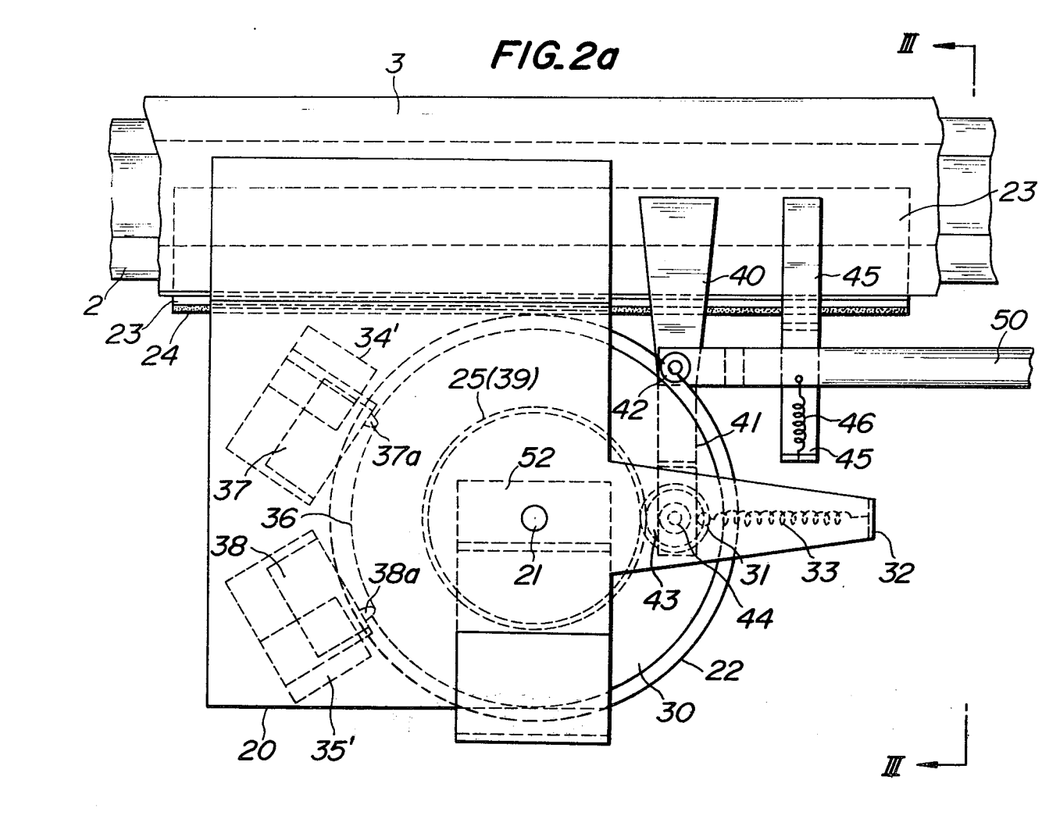
FIGS. 2a and 2b are partial enlarged views of FIG. 1.

As shown in FIG. 2a, the memory wheel 30 is provided with the re-entrant recess 36 on its periphery so that in the stationary position of the memory wheel 30, the operating levers 37a and 38a of the memory switches 37 and 38 engage at both extremities of the recess 36 and place both switches in the OFF condition to stop the motor 7. Below the memory position wheel 30, the second gear 39 is mounted integrally therewith.

The memory wheel 30 and the measuring wheel 22 are supported coaxially by a supporting bracket 52, but they can rotate independently of each other.

Bending portions of L-shaped arms 41 and 41' are pivotally supported by a vertical axis or pivot 42 on a bearing support 40 mounted on the upper rail 3. Inside the fork shaped portion of the two arms 41 and 41', an intermediate gear 43, which meshes with the second gear 25, (39), is pivotted on an axis or pivot 44. Further a spring 46 extends between a reset lever 50 extending on the L-shaped arms 41 and 41' and a bracket 45 mounted on the upper rail 3 so as to apply a clockwisely rotating bias force to the reset lever 50 in FIG. 2a or 2b about the axis 42, i.e. in a direction in which the intermediate gear 43 meshes with the first and second gears 25 and 39.

In FIG. 1, reference numeral 60 illustrates a motor driving switch for energizing the motor 7 to move the second gearbox 8 forwardly. Further numeral 60F is the forward movement position and 60R is the rearward movement position of the switch 60. This switch is so arranged as to return to its normal position 60N and the switch is mounted at a position easily controllable at the side of the seat cushion A.

Reference numeral 70 in FIG. 1 is a return switch for moving the gearbox 8 to the memorized position. This return switch 70 is mounted at the same side of the seat cushion A as is the motor driving switch 60.

The circuit of the device according to the present invention shown in FIG. 5 will now be explained.

Reference numeral 15 illustrates an electric current source such as a battery, which comprises a positive terminal 15a and a negative terminal 15b. Numeral 16 is a circuit breaker which acts as a fuse for over current so as to protect the circuit and the current source. Reference numeral 7 indicates the motor as mentioned above. The return switch 70 is connected in the circuit and is used to return the second gearbox 8 to the memorized position. Reference numeral 17 is a relay having an exciting coil 19. When the exciting coil 19 is energized by switching on the return switch 70, the connections between 17a-17b and 17d-17e are switched to 17a-17c and 17d-17f respectively and also a connection 17g-17h is established. By switching off the return switch 70, the switching members are returned to the side of 17b and 17e and the connection between 17g-17h is interrupted. The reference numeral 60 is the aforementioned automatic return type manual motor driving switch. This switch 60 comprises switching members 60e and 60b normally connected to the positive terminal 15a of the source 15, switching members 60c and 60f normally connected to the negative terminal 15b, a member 60a connected to the terminal 7a of the motor 7 through a contact member of the relay 17, and a member 60d connected to the terminal 7b of the motor 7 also through a contact member of the relay 17. Normally the switch members are restored and located at the side of contacts 60b and 60e. This condition is indicated in FIG. 1 by switch position 60N of the motor driving switch 60. The connection of 60a-60c indicated by a dash-dot line corresponds to switch position 60F and the connection of 60d-60f indicated by dash-dot line corresponds to switch position 60R of the switch 60.

Reference numerals 37 and 38 denote the two memory switches. These two switches are placed in the OFF condition when the operating levers 37a and 38a are located in the recess 36. Namely if the operating levers 37a and 38a are in contact with the contact elements 37b and 38b, respectively, the switches are in the OFF condition. If either one of the operating levers 37a and 38a comes in contact with the contact 37c or 38c, the respective switch is placed in the ON condition. FIG. 5 indicates with full or thick lines the condition in which both the operating levers are located in the OFF position and the motor driving switch 60 is in the neutral position (60N).

Reference numerals 11 and 12 are the limit switches as mentioned above and 18a, 18b and 18c are diodes.

The operation of the device will be explained below.

When a driver wishes to move the seat A forwardly, the motor driving switch 60 is switched from the position 60N to the position 60F. Then the connection between 60a and 60b is switched to that between 60a and 60c (shown by dash-dot line in FIG. 5). In this case, a current flows from the positive terminal 15a of the current source in the following circuit. 15a→contact 60e of the motor driving switch 60→60d→contact 17e of the relay 17→17d→motor 7→17a→17b→contact 60a of the motor driving switch 60→60c→limit switch 11→negative terminal 15b of the current source. Accordingly, a current flows through the motor 7 in a direction shown by an arrow P. By this, the motor 7 also shown in FIG. 1 is energized and the main screw 5 is driven via the first gearbox 6 so that the upper rail 3 is driven forwardly by the second gearbox 8 and the bridge member 4, and so that the seat is moved forwardly. By this forward movement of the upper rail 3, the measuring wheel 22 rotates over the member 24 and the first gear 25 rotates therewith. Further through the intermediate gear 43, the second gear 39 and the memory position wheel 30 rotate in counter clockwise direction against the force of the spring 33. When the seat reaches to a predetermined most suitable position i.e., the position to be memorized, the motor driving switch 60 now located at the position 60F is placed back to the neutral position 60N. In this case the operation of the motor driving switch 60 is not related to the ON and OFF switching condition of the memory switches 37 and 38. When the motor 7 is stopped, the reset lever 50 being a resetting device is manually operated towards the arrow marked T also shown in FIG. 2a and 2b. By this movement the arm 41 is rotated about the pivot 42 in a counter clockwise direction and the intermediate gear 43 is disengaged from the first gear 25 and the second gear 39. The memory wheel 30 and the second gear 39 return to the stationary position as indicated in FIG. 2a by the bias force of the spring 33 and the operating levers 37a and 38a of the memory switches 37 and 38 are both extended into the recess 36 of the memory position wheel 30. Therefore both the memory switches 37 and 38 adopt the OFF condition. Namely the operating levers 37a and 38a are placed in contact with 37b and 38b in FIG. 5. This position is the position of seat A to be memorized.

If it is desired to move the seat a little bit backwardly, the motor driving switch 60 is to be switched from the position 60N to 60R. Then the connection between 60d-60e is switched to 60d-60f as shown by the dash-dot line in FIG. 5. By this switching, the current flows from the positive terminal 15a in the following circuit: 15a→contact 60e of the motor driving switch 60→60b→contact 17b of the relay 17→17e→contact 60d of the motor driving switch→60f→limit switch 12→negative terminal 15b of the current source 15 so the current flows through the motor 7 in a direction shown by an arrow Q.

Thus the motor 7 is energized and as shown in FIG. 1, the main screw 5 rotates via the first gearbox 6 and through the second gearbox 8 and the bridge member 4, the upper rail 3 moves backwardly over the lower rail 2 and the seat is moved backwardly. By this rearward movement of the upper rail 3, the measuring wheel 22 revolves over the member 24, the first gear 25 rotates, and via the intermediate gear 43 the second gear 39 and the memory position wheel 30 rotate clockwise against the bias force of the spring 33. By this rotation of the memory position wheel 30, between the two micro-switches 37 and 38 only the micro-switch 38 adopts the ON condition. In this case, the contact member 38a comes in contact with 38c in FIG. 5. After moving the seat to the suitable selected rearward position the motor 7 may be stopped by switching the motor driving switch from 60R to 60N.

Then if it is wished to return the seat back to the originally memorized position, the return switch 70 provided on the side of the seat A is moved to the ON position. Through the return switch 70, the electromagnetic coil 19 of the relay 17 is energized and this relay 17 operates. In this case, connections 17a-17c, 17d-17f, 17g-17h are made so that the following current paths are established.

Terminal 15a of the current source 15→contact of return switch 70→diode 18c→relay coil 19 of the relay 17→diode 18a→17f→17d→motor 7 (in the direction of arrow P)→17a→17c→38a→38c→limit switch 11→terminal 15b.

Terminal 15a→contact 37b of the memory switch 37→37a→and to the above circuit.

Terminal 15a→17g→17h→coil 19→and the above circuit. (This does not pass through the return switch 70.)

By the existence of the last mentioned circuit, the relay 17 holds itself energized even after the return switch 70 is released.

Figure 2B:
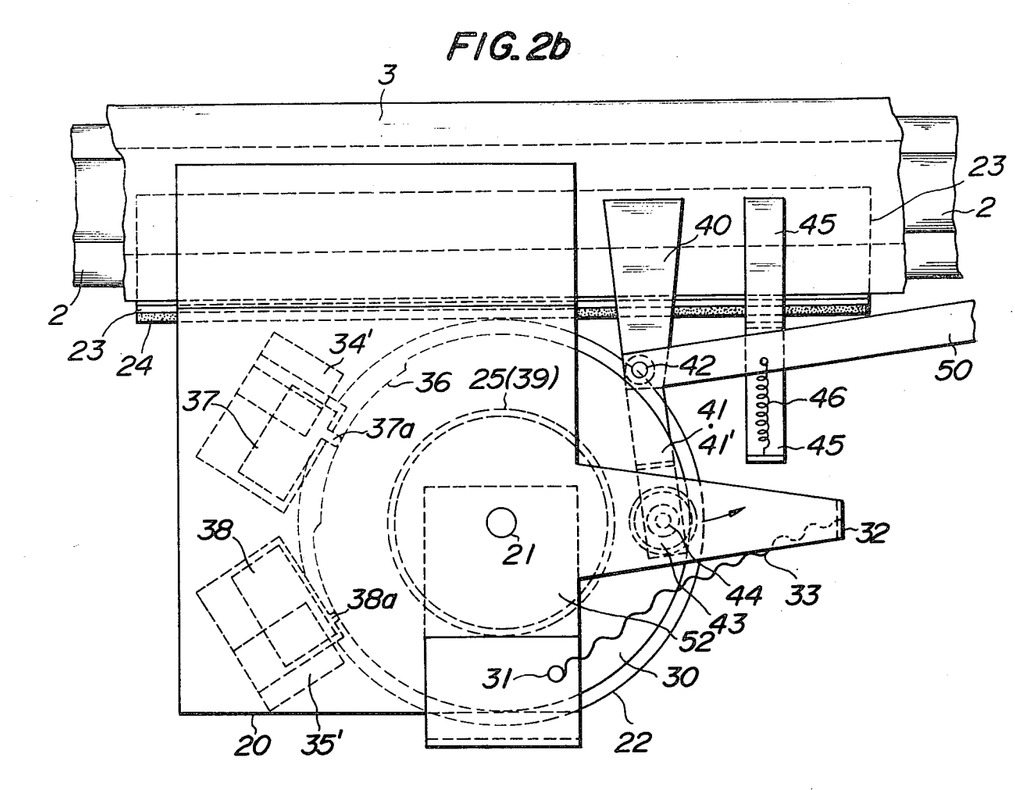

By the actuation of the motor 7, the measuring wheel 22 rotates counter clockwise keeping contact with the member 24 as can be seen from FIGS. 1, 2a and 2b. By the rotation of the measuring wheel 22, the memory position wheel 30 also rotates via the intermediate gear 43 in the same rotating direction. By an engagement of the operating lever 38a of the memory switch 38 with the recess 36 formed on the periphery of the memory wheel 30 (see FIG. 2b), the memory switch 38 adopts the OFF condition just the same as the memory switch 37, which normally is in the OFF condition. In this case, the initial memory position is assumed, in which the original connection 38a→38b is established. Accordingly, no current will then flow through the motor 7 and the motor discontinues the operation. This means that the seat has now returned to the originally memorized position. However, the driving of the motor 7 is possible by moving the switch 60 from the position 60N to either 60F (forward) or 60R (rearward). The use of the return switch 70 is limited only for the time of automatic return to the memorized position. For instance, if the seat position convenient for driving is once memorized, it is possible to return the seat to the driving position by one-touching motion of the return switch 70 even if the seat cushion A is located forwardly and the seat back B is collapsed back in a lay down position. If the limit switch 11 is disconnected, i.e. when the seat is located in the forwardmost position, the connection 60d-60e of the switch 60 is altered to 60d-60f. Then a current will flow through the motor 7 in the Q direction through limit switch 12 and the motor rotates in the opposite direction. The limit switch 11 then is again connected. If on the contrary, the limit switch 12 is operated to interrupt the connection, the connection 60a-60b of the motor drive switch 60 may be changed to 60a-60c, i.e. to change to drive forwardly.

As has been mentioned in the foregoing, the most suitable selected position of the seat can be memorized according to the present invention. In the device of the present invention, the driving power can be made very small since the device is made on a principle of just disconnecting the joint between the measuring wheel and the position memory wheel of the memory. This attribute also improves the accuracy of the memory.

In the abovementioned embodiment, the joint or connection between the measuring wheel and the position memory wheel is arranged substantially in a 1:1 ratio. However, this connection ratio is not limited to such 1:1 ratio only, but it may be arranged either with an acceleration connection or a deceleration connection. If the acceleration connection is provided the accuracy of the memory is increased. If the deceleration connection is provided the range of the memory may be widened.

In the foregoing embodiment a gear train is used for the transmission of the torque. However, the invention is not limited to the use of such a gear train, but a frictional power transmission wheel, pulley, string or cord or other means may be used.

The spring 33 is not limited to a coiled spring but a spiral spring provided on the pivot of the memory wheel may be used.

Figure 4:
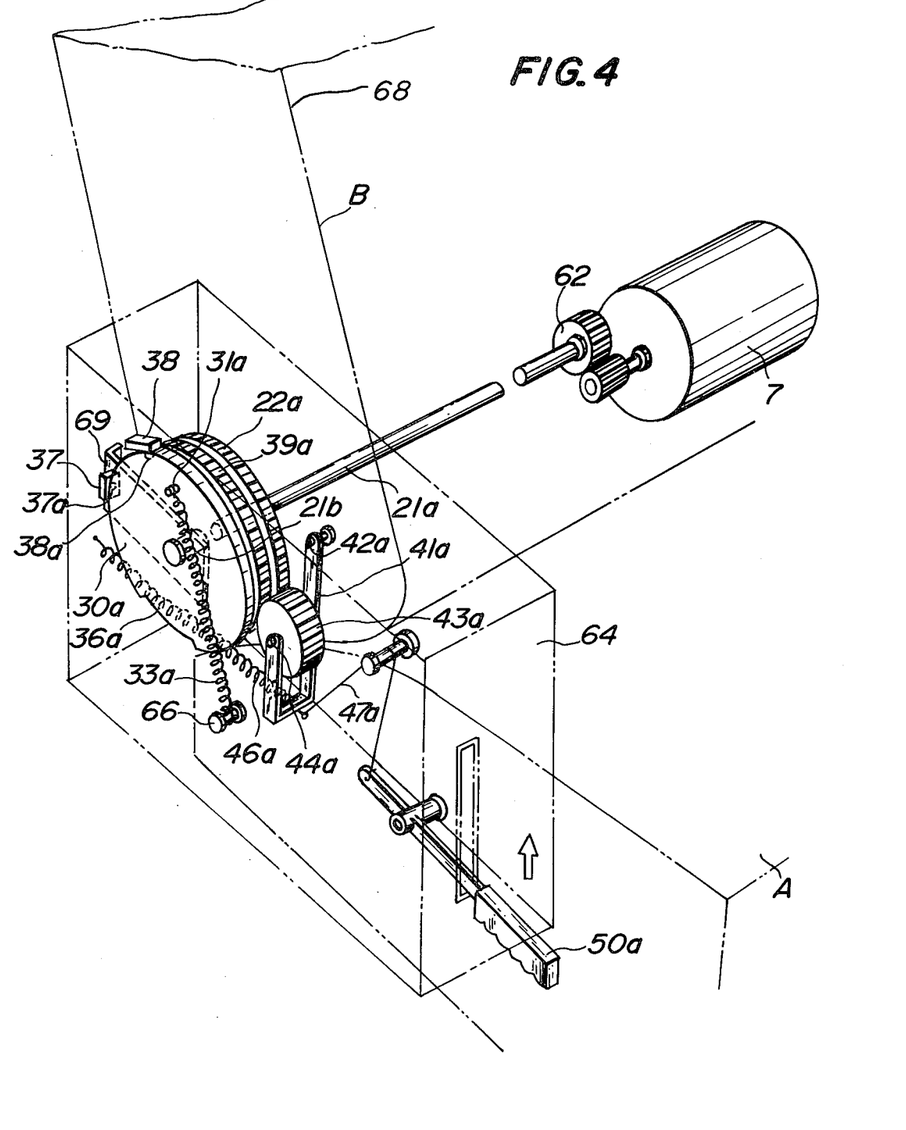
FIG. 4 is a partial perspective view of a reclining seat having a position memory device according to the present invention.

FIG. 4 illustrates a further embodiment of the present invention for application to a reclining seat. The same reference numerals as shown in FIGS. 1 to 3 represent the same elements but are provided with the character "a" thereafter.

At one end of a supporting shaft 21a of the seat back B, a first gear 22a is mounted, and on the other end of said shaft a measuring wheel 62 for conveying the driving power of the motor 7 is mounted. Further a memory wheel 30a and a second gear 39a are jointly fixed in a simultaneously rotatable manner on a second shaft 21b, pivoted on a support 69 and provided coaxially with said supporting shaft 21a. A spring 33a is provided to exert a bias force to a pin 31a mounted on the position memory wheel 30a to restore it to a certain stationary position. The other end of the spring 33a is engaged with a stopper or post 66 mounted on an inner wall of the frame 64. On the peripheral surface of the position memory wheel 30a, operating levers 37a and 38a of the switches 37 and 38 are engaged in a manner in that both the operating levers 37a and 38a engage with a recess 36a at both extremities and both the switches adopt the OFF condition in said stationary position of the memory wheel 30a. (By engagement of either one of the memory switches the OFF condition is not reached)

A lever 41a is supported by the shaft 42a and at the end portion of the lever 41a, an intermediate gear 43a which may mesh with the first gear 22a and the second gear 39a is journaled on a shaft 44a. The lever 41a is biased by a spring 46a in a direction to mesh with the gears and the lever is connected to a controlling reset lever 50a via a flexible wire 47a.

In this device at the most suitable selected position of the seat back B in the rotating angle, a reset lever 50a may be operated to disengage the intermediate gear 43a from the first gear 22a and second gear 39a, with the memory wheel 30a returning to the stationary position, i.e. to the position where both the operating levers 37a and 38a of the memory switches 37 and 38 adopt the OFF condition. If the reset lever 50a is released from this condition an engagement with the first gear is made. This means that both the memory switches 37 and 38 adopt the OFF condition at the most suitable position of the rotating angle of the seat back B so that by an automatic drive of the power motor 7 for moving the seat back B, said seat back B is automatically returned to the selected suitable position. In the drawing reference numeral 68 shows the cushion.

FIGS. 6 to 10 show further modified embodiment of the present invention.

Figure 6:
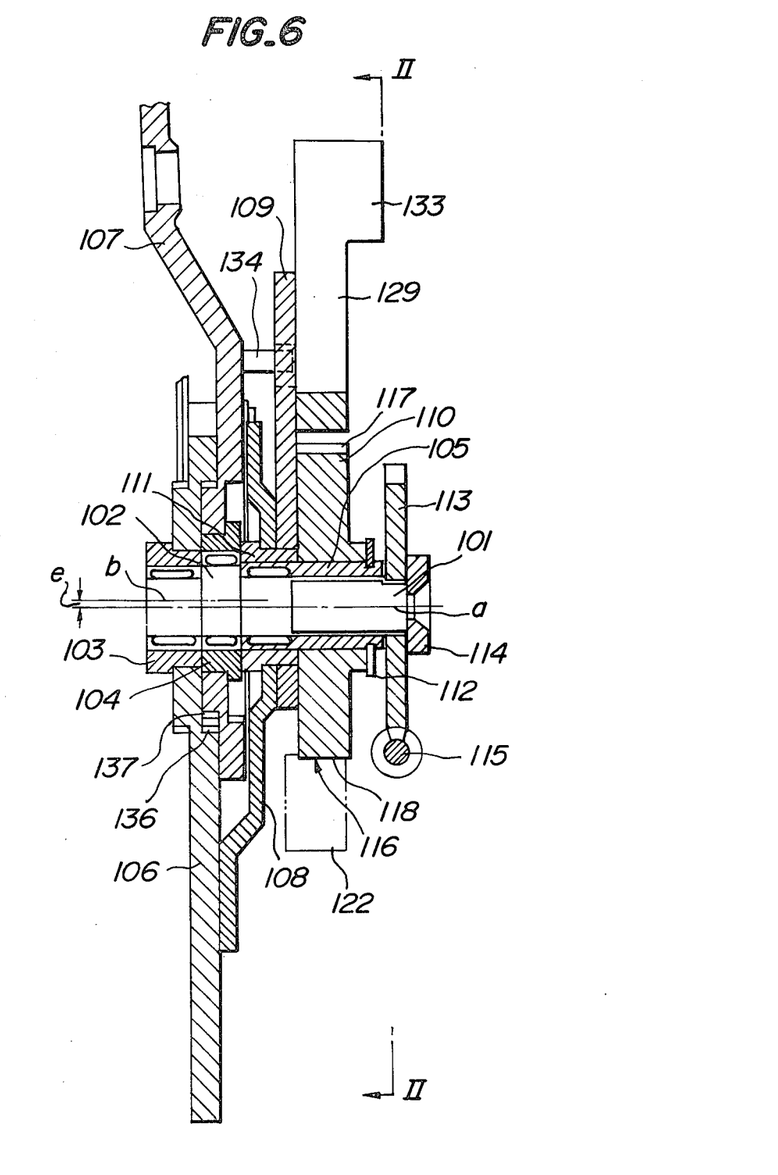
FIG. 6 is a cross-sectional view for showing another embodiment of the present invention.
Figure 7:
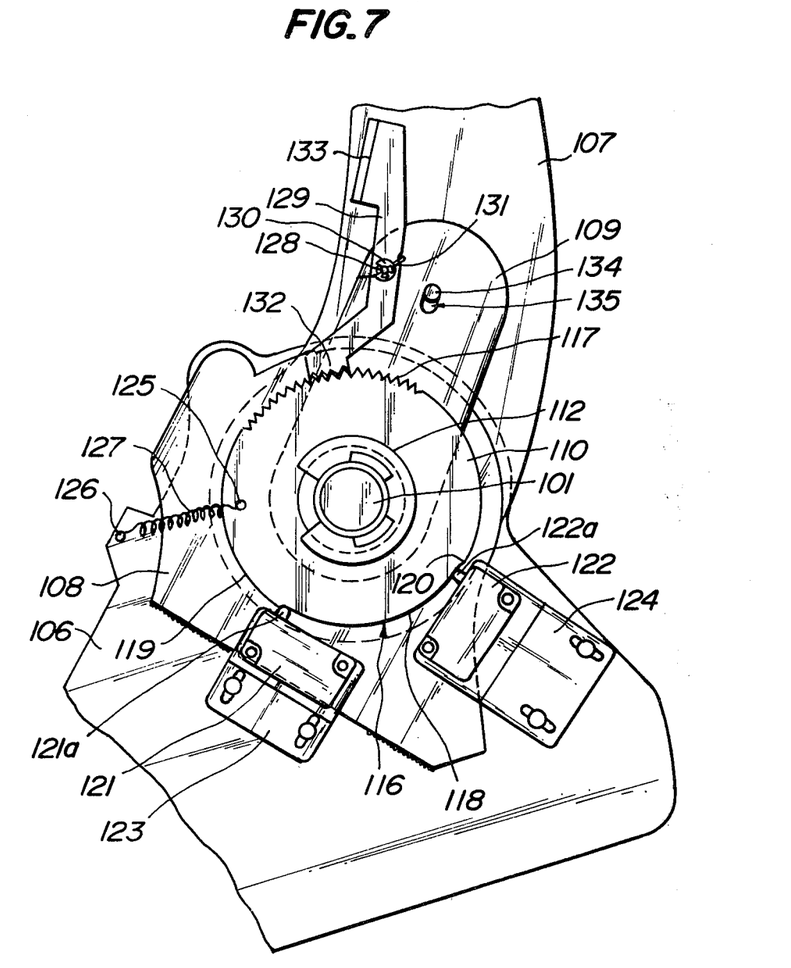
FIG. 7 is a cross-section taken along the line II—II of FIG. 6.
Figure 8:
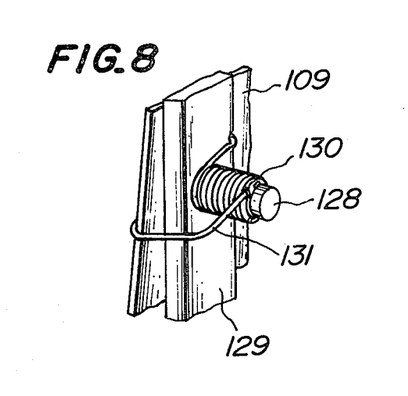
FIG. 8 is a partial enlarged view of a stopper shown in FIG. 6.

The device shown in FIG. 6 comprises a shaft 101. This shaft 101 has an eccentric shaft portion 102 having its axis b shifted by a distance "e" from an axis a of the shaft 101. Onto this shaft 101, a left end bushing 103 having a bearing portion, an eccentric bushing 104, and a right end bushing 105 are mounted in order from the left in a freely rotatable manner. Onto these bushings 103, 104, 105, a seat cushion plate 106, a reclining arm 107, a support plate 108, an arm bracket 109, and a memory wheel 110 are mounted in order from the left in a freely rotatably manner. The aforementioned cushion plate 106 is journaled on the shaft 101 via the left end bushing 103 and is secured in position by a shoulder portion formed on the left end bushing 103 so as not to fall off the shaft to the left side. The reclining arm 107 is journaled on the eccentric shaft portion 102 by means of the bushing 104. The support plate 108 and the arm bracket 109 are journaled on an auxiliary bushing 111 provided on the right end bushing 105. The memory wheel 110 is directly journaled on the right end bushing 105. A snap ring 112 is mounted on the right end bushing 105 to support the right end of the memory wheel 110 so as to prevent the dropping off of the supported members on the bushings. One portion of the periphery of the shaft 101 extending past the right side end of the right end bushing 105 is cut so as to mount a worm wheel 113 which does not rotate against the shaft 101. The worm wheel 113 is fixed by a securing plate 114 fixed by a screw or the like to the shaft 101 in a manner so as not to rotate against the shaft 101. The worm wheel 113 is meshed with a worm 115 being rotated in either direction by a motor not shown in the drawing. The support plate 108 is arranged to contact the reclining arm 107 in the upper portion to prevent bending of the arm 107 and the lower edge is fixed to the seat cushion plate 106.

On the other hand, said memory wheel 110 is formed of a disk provided with a cam portion 116 at the lower periphery thereof, a gear portion 117 (meshing portion) at the upper periphery thereof and and a center which is journaled to the shaft 101 in a freely rotatably manner. The cam portion 116 has a small circular portion 118 and a large circular portion 119 and the transition between the two portions is formed as a curved cam surface. Against this cam surface, detecting members 121a and 122a of a forward drive switch 121 and a rearward drive switch 122 are in contact therewith. The switches deliver signals to drive the worm 115 in either direction by detecting the degree in angle of inclination of the reclining arm 107. The detecting members 121a or 122a are arranged to produce the signals after adopting the ON condition when contacting with the large circle portion 119. The abovementioned two switches 121 and 122 are mounted on two brackets 123 and 124 secured on the seat cushion plate 106 and support plate 108, respectively, by screws or the like. The memory wheel 110 is arranged to return to a certain predetermined position by a coil spring 127 extended between a pin 125 mounted on the memory wheel 110 and a pin 126 mounted on the seat cushion plate 106. In the position of the memory wheel 110 shown in FIG. 7, the detecting elements 121a and 122a of the two switches 121 and 122 are in contact with the transition portion of the cam surface so that both the switches 121 and 122 are in the OFF condition. When the forward rotation switch 121 adopts the ON condition, the memory wheel 110 is driven to rotate forwardly i.e. clockwise in FIG. 7 by the worm 115, the worm wheel 113 and the shaft 101. When the reverse rotation switch 122 adopts the ON condition, the memory wheel 110 is driven to rotate reversely (counterclockwise).

On the other hand, a pin 128 is provided on the arm bracket 109 extending towards the gear portion of the memory wheel 110 and onto this pin 128 is mounted a stopper 129 which is an elongated member pivoted about its center in a freely rotatable manner. This stopper 129 is shown in more detail in FIG. 8. A torsion coil spring 131 is provided by inserting the cylindrical portion onto the support pin 128 using an E-shaped ring 130, engaging one end at the side edge of the stopper 129 and engaging the other end at an edge of the arm bracket 109. By this spring 131, a pawl 132 formed at the lower edge of stopper 129 is biased to mesh with the gear portion of the memory wheel 110. The pawl 132 of the stopper 129 has a gear shaped lower surface and the upper end of the stopper 129 is formed with a handle 133. The arm bracket 109 is engaged with a mounting pin 134 provided on the reclining arm 107 at an engaging hole 135 so that the arm bracket 109 rotates about the shaft 101 together with the reclining arm 107. Instead of the torsion coil spring 131, a normal coil spring similar to the spring 127 may be used. The gear on the pawl 132 may be substituted for by some projection engaging with the gear portion 117.

Said seat cushion plate 106 is provided with inner gear teeth 136 at a side facing the reclining arm 107. Outer gear teeth 137 meshing with said inner gear teeth 136 are provided on the reclining arm 107. The outer gear 137 has a smaller number of teeth than said inner gear 136 at least by one tooth and the gear is formed to have a smaller diameter in an amount corresponding to the teeth height.

Figure 9:
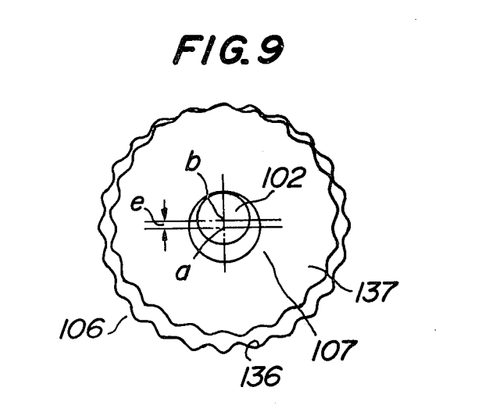
FIG. 9 is a simplified diagram for showing the relation between an inner gear and an outer gear.

The shaft 101 is pivotted on the seat cushion plate 106 having the inner gear teeth 136 so that if the shaft 101 is rotated in the clockwise direction in FIG. 9, the inner gear teeth 136 and the outer gear teeth 137 successively change the meshing position therebetween by the aforementioned difference e between the position of axis a of the shaft 101 and the axis b of the eccentric shaft portion 102. The reclining arm 107 having the outer gear teeth 137 and the outer gear teeth 137 itself rotates in the opposite direction i.e. counterclockwise at the drawing in a reduced speed. If the shaft 101 is rotated counterclockwise, the reclining arm 107 rotates clockwise as is apparent from the above explanation.

The reclining operation will be explained by referring to the memory circuit shown in FIG. 10. This circuit illustrates a condition in which the memory wheel 110 is in the normal position. In this position both the switches 121 and 122 are in the OFF condition and the contact arms are in contact with the B contacts. Accordingly, no circuit is established by closing a return switch 138 and the motor M is not energized. Then a driver may sit on the seat and by controlling buttons of the control circuit not shown in the drawing, rotate the shaft 101 so as to recline the reclining arm 107 forwardly or rearwardly. If the reclined position is desired to be memorized, a control end or handle 133 of the stopper 129 is depressed. By this, the stopper 129 rotates about the supporting axis 128 and the pawl 132 meshed with the gear portion 117 of the memory wheel 110 is disengaged. As the memory wheel 110 had been rotated together with the reclining arm 107 at the time of the rotating operation of the reclining arm 107, the spring 127 had been expanded and by the restoring force of the spring 127, the memory wheel 110 is rotated and restored into the position indicated in FIG. 7 where both switches 121 and 122 are in the OFF condition. By removing the applied force at the handle 133 so as to mesh the pawl 132 against the gear portion 117 of the memory wheel 110, the reclined position of the reclining arm 107 is now memorized.

Then by the operation of the operating button of the operating circuit not shown in the drawing, to rotate the shaft 101 to change the reclining angle of the reclining arm 107 at choice, the cam portion 116 acts to operate either the forward switch 121 or the rearward switch 122 to switch from the contact B to the contact A.

Figure 10:
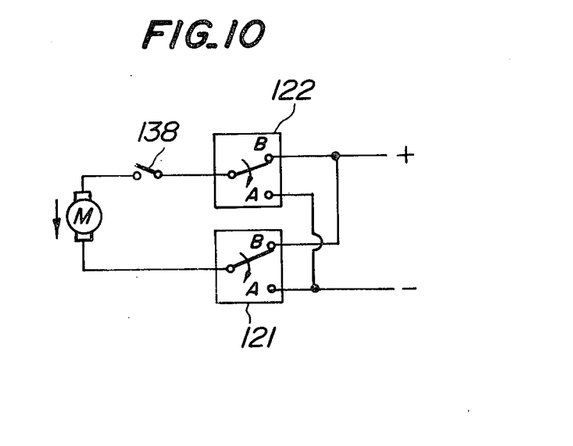
FIG. 10 is a circuit diagram of the operating circuit of the embodiment shown in FIG. 6.

If it is desired to return the reclining arm 107 to the memorized position, the return switch 138 in the memory circuit shown in FIG. 10 may be depressed. In this case if the forward switch 121 has been operated to the ON condition i.e. the switch arm is in contact with the A side, current flows through a circuit of positive terminal ⊕→B contact of the rearward switch 122→return switch 138→motor M→A contact of the forward switch 121→earth (negative terminal ⊖) so as to rotate the motor M forwardly. The reclining arm 107 is reclined forwardly towards the seat cushion side (counter clockwise). The motor M continues to rotate until the memory wheel 110 adopts the normal position, where the contact of the forward switch 121 is switched from the contact arm A to the arm B by the cam portion 116. Thus the current applied to motor M is interrupted and the reclining arm 107 is now placed at the position memorized in the previous operation.

By this embodiment of the present invention, the reclining position can be memorized by a very simple mechanism so that overall cost of the device can be decreased.

Further according to this embodiment of the invention, the operating lever (stopper 129) to be operated at the time of memorizing the reclining position can be handled very easily by simply depressing its handle 133 so as to disengage the pawl 132 at the other end from the memory wheel 110.

The seat reclining device as has been mentioned in the foregoing is very easy to handle in operation and can be made at reasonable cost so that it can be applied widely.

What is claimed is:

1. A position memory device for a power driven seat of a vehicle comprising:

a rotatable memory wheel which is connectable to the seat;

means for connecting and disconnecting the memory wheel to and from the seat to convert movement of the seat to rotation of the memory wheel when connection therebetween is established;

means for rotating the memory wheel into a first position when the memory wheel is disconnected from the seat;

memory switch means coupled to the memory wheel, the switch means being set in the OFF condition while the memory wheel is in the first position, and being set in the ON condition while the memory wheel is in a position other than the first position; and power drive means able to move the seat together with the memory wheel while the switch means are in the ON condition, and being disabled from moving the seat while the switch means are in the OFF condition;

whereby, after the seat is stopped in a desired position and the memory wheel is disconnected from the seat and rotated to the first position, the memory wheel is connected to the seat to thereby memorize the desired position so that the seat may be returned to the memorized position from another position by the power drive means.

2. A position memory device as claimed in claim 1, wherein the memory wheel includes a measuring wheel and a position memory wheel, the position memory wheel being provided with a re-entrant portion on its periphery, and the memory switch means including two memory switches which cooperate with the re-entrant portion of the position memory wheel, each switch being set in the OFF condition while engaged in the re-entrant portion and each switch being set in the ON condition while free of the re-entrant portion, and both switches being placed in the OFF condition determining the placement of the memory wheel in the memorized position.

3. A position memory device as claimed in claim 2, wherein the memory wheel comprises a first portion rotating in relation with the movement of the member of the seat, a separate second portion engaging with the memory switches, a mechanical connection between the first portion and the second portion with a rotating force is formed by a pair of gears and an intermediate gear is disengaged by a reset lever with said gears.

4. A position seat memory device as claimed in claim 2, wherein the means causing the memory wheel to rotate comprises a spring disposed between the memory wheel and the body of the vehicle.

5. A position seat memory device as claimed in claim 2, wherein the power drive means is for moving the seat forwardly and rearwardly, and comprises a motor having an output shaft, a pinion carried by the output shaft, and a rack arranged in mesh with the pinion and on which the seat is mounted.

* * * * *